United States Patent Office 3,784,648
Patented Jan. 8, 1974

3,784,648
PROCESS FOR THE PREPARATION OF FREE-FLOWING, LUMP-FREE, REDISPERSIBLE, SYNTHETIC RESIN POWDERS
Eduard Bergmeister, Paul-Gerhard Kirst, and Heinz Winkler, Burghausen, Germany, assignors to Wacker-Chemie GmbH, Munich, Germany
No Drawing. Filed Oct. 1, 1971, Ser. No. 185,807
Int. Cl. C08g 37/32
U.S. Cl. 260—856        7 Claims

ABSTRACT OF THE DISCLOSURE

This invention relates to a process for the preparation of free-flowing, lump-free, redispersible synthetic resin powders by spray-drying aqueous dispersions of synthetic resins containing an added amount of a water-soluble condensation product from melamine, formaldehyde and containing sulfonate groups.

THE PRIOR ART

Redispersible, synthetic resin powders are prepared by the spray-drying of aqueous synthetic resin dispersions with the aid of a unitary or binary nozzle in a hot air stream. Particularly when starting from synthetic resin dispersions whose polymers have a low softening temperature, either in the spray-drying, a caking of the particles occurs, or the powder formed tends under the influence of heat and/or pressure to form lumps. Under these conditions, the redispersibility and the flow properties of the powders are destroyed.

One method for the improvement of such dispersion powders consists in adding, either during the polymerization or before the spray-drying of the dispersions, large amounts of protective colloids. By this method, the dispersibility is indeed improved, but other properties of the powders are impaired, for example the stability to water spotting and resolution is strongly diminished.

It has been further known, to add inert substances to the dispersion before the spray-drying or to the dispersion powder before the drying. Such adducts only show an effect, if they are applied in large amounts, whereby the properties of the synthetic resin powders are strongly influenced. On the application of small amounts, the inert substance is enveloped by the synthetic resin, so that the addition has no effect.

Generally these redispersible synthetic resin powders are utilized as adducts to hydraulic setting masses. In this use, it is often found, that the compression, flexural tensile and adhesive strength of the masses is not sufficient and is, in addition, adversely affected by the addition of inert substances and protective colloids.

OBJECTS OF THE INVENTION

An object of the invention is the development of a process for the production of free-flowing, lump-free, redispersible synthetic resin powders which are free of the above-mentioned drawbacks.

Another object of the invention is the development of a process for the preparation of free-flowing, lump-free, water-redispersible synthetic resin powder which consists essentially in spray-drying an aqueous polymerizate dispersion of a synthetic resin having added thereto from 2% to 30% by weight, based on the solids content of said polymerizate dispersion, of a water-soluble condensation product of melamine and formaldehyde containing sulfonate groups under customary spray-drying conditions and recovering said free-flowing, lump-free, water-redispersible synthetic resin powder.

These and other objects of the invention will become more apparent as the description thereof proceeds.

DESCRIPTION OF THE INVENTION

The above objects have been achieved and the disadvantages of the prior art have been overcome by the newly formed process for the preparation of free-flowing, lump-free, water-redispersible synthetic resin powder by spray-drying of aqueous polymerizate dispersions of synthetic resins under conventional spray-drying conditions that is characterized in that, before the spray-drying of the dispersions, water-soluble condensation products from melamine and formaldehyde containing sulfonate groups are added to the dispersions in amounts of from 2% to 30% by weight, preferably from 5% to 19% by weight, based on the solids content of the dispersion.

It is surprising to find that the addition, according to the invention, prevents a caking of the powders during the preparation and in addition, increases their storageability. Even under influence of heat and pressure no caking of the powders occurs, so that the redispersibility is maintained completely and the powders are free-flowing.

These advantages are particularly apparent in the application of the process to the spray-drying of dispersions whose polymeric constituents have a softening point of from 0° C. to 40° C. (For the determination of softening point see "Adhäsion," 1966, 3, pages 57–100.)

It is also surprising that the adhesive power of the hydraulic setting masses, prepared with the powders, according to the invention, is not reduced and, moreover, an improvement of the compression and flexural tensile strength occurs.

The claimed process is applicable to many types of aqueous polymerizate dispersions of synthetic resins. Examples of such polymer dispersions are homopolymerization, copolymerization and graft polymerization dispersion products of acrylic acid esters particularly esters of alkanols having 1 to 18 carbon atoms; styrene and, acrylic or methacrylic acid esters particularly esters of alkanols having 1 to 18 carbon atoms; styrene and butadiene; styrene, butadiene and acrylic acid esters, particularly esters of alkanols having 1 to 18 carbon atoms; vinyl esters, particularly esters of alkanoic acids having 2 to 18 carbon atoms such as vinyl acetate; vinyl acetate and straight-chain vinyl esters and alkanoic acids with 3 to 18 carbon atoms; vinyl acetate and branched vinyl esters of branched alkanoic acids with 4 to 18 carbon atoms; vinyl esters, particularly vinyl esters of straight or branched chain alkanoic acids having 2 to 18 carbon atoms, and vinyl chloride and/or olefins, particularly olefins having 2 to 4 carbon atoms; vinyl chloride acrylic acid esters, particularly esters of alkanols having 1 to 18 carbon atoms, and vinyl acetate; vinylidene chloride and acrylic acid esters, particularly esters of alkanols having 1 to 18 carbon atoms.

Polymers with a low softening point for which the process is particularly suitable, are for instance copolymers from vinyl acetate and/or vinyl chloride and ethylene, preferably with up to 30% by weight of ethylene; vinyl acetate and/or vinyl chloride and vinyl laurate with over 20% by weight of vinyl laurate; vinyl acetate and acrylic acid esters with alcohols of a chain length of more than 4 carbon atoms; vinyl acetate and vinyl "Versatic acid" esters ("Versatic acid," trade name for branched alkanoic acids having from 8 to 18 carbon atoms) and vinyl propionate copolymers.

The synthetic resin dispersions are prepared by conventional processes by free-radical polymerization of the monomers in water in the presence of emulsifiers and/or protective colloids, and, optionally, chain-length regulators and buffers as well as other polymerization auxiliaries.

According to the invention, the condensation product from melamine and formaldehyde, containing sulfonate groups, is admixed either as a powder or preferably in aqueous solution to the polymer dispersions, to be spray-dried. Subsequently the mixture is subjected to known spray-drying process under conventional conditions of exposure to warm gases such as air to temperature of from 30° to 50° C.

The water-soluble condensation products from melamine and formaldehyde containing sulfonate groups which are principally suitable are the condensation products of melamine, formaldehyde and containing sulfonate groups in which the molar ratio of melamine to formaldehyde to sulfonate group is in the range of 0.5 to 2:2 to 4:0.5 to 2. Preferable is the condensation product of melamine, formaldehyde and sodium bisulfite in a 1:3:1 ratio where the condensation product has the formula

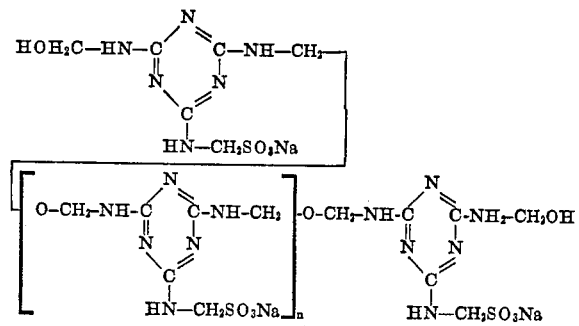

where $n$ is an integer from 5 to 300, preferably 10 to 100.

As sulfonates alkali metal bisulfites are preferred. The condensation products prepared from formaldehyde, melamine and sulfonates are commercially available, for example, under the trademark "Melment" of the Süddeutsche Kalk-Stickstoff-Werke AG, Torstmerg, Germany. Also condensation products can be utilized that contain free sulfonic acid groups.

It may also be advantageous, optionally to add, to the dispersion before spray drying protective colloids, such as polyvinyl alcohol, cellulose derivatives and polyvinyl pyrrolidone, or inert substances, such as kaolin, chalk, silicates, talc, diatomaceous earth, silicic acid, barium or calcium sulfate, in amounts of from 5% to 50% by weight, based on the solids content of the synthetic resin powder. Thereby in some cases improvements in the storageability are also attained.

The redispersible powders, according to the invention, may be used in all already known application fields. A preferred application is the addition of these powders for the improvement of hydraulic setting masses in amounts from 2% to 25% by weight, based on the hydraulic setting ingredients.

Examples of such hydraulic setting masses are floor tile adhesives, fillers, plasters for facing, adhesive plasters, concrete mortar, sparkling mortar and concrete flooring. Improvements, above all in the compression, adhesive and flexural tensile strength are attained.

Optionally for the prevention of foaming, which is particularly disturbing in the use in hydraulic setting substances, a known, solid antifoam agent is added to the dispersions made from the powders, according to the invention. Such antifoam agents are, for example, prepared by applying a silicone defoamer or an alcohol to a porous, inert material and thus the liquid defoamer may be applied as a solid.

The following examples are illustrative of the invention without being limitative in any manner.

EXAMPLE (1a) A synthetic resin dispersion with a 50% by weight solid content of an ethylene/vinyl acetate copolymer containing 10% by weight of ethylene was spray-dried. There was hardly any powder separation as more than 80% of the synthetic resin adhered to the walls of the apparatus.

(b) To the same dispersion were admixed 2% by weight, based on the solid content of the dispersion, of a melamine-formaldehyde-sodium sulfonate condensation product (Melment L10) with a molar ratio of 1:3:1 in the form of a 20% aqueous solution. On spray-drying, the separation of powder was 95%. The thus prepared powder was well redispersible and gave films that did not dissolve in a short-term exposure to water. In addition, the powder stored well. With the addition of 10% by weight of aluminum silicate, the powder held up in storage at elevated temperature and pressure.

6% by weight of the so prepared powder (b) were admixed to a floor-tile adhesive of 30% by weight of portland cement and 70% by weight of finely divided quartz sand. With the aid of this adhesive, there is an outstanding adhesion of ceramic floor-tiles on wood, concrete or plaster.

EXAMPLE (2a) A synthetic resin dispersion with a 48% by weight solid content of an ethylene/vinyl acetate copolymer containing 30% by weight of ethylene was spray-dried after an addition of 10% by weight, based on the solid content of the dispersion, of polyvinyl alcohol with a saponification number of 140 and a viscosity of 5 cp. (in a 4% solution at 20°C.). Very little powder discharge resulted.

(b) To the same dispersion was added, before the spray-drying, instead of the polyvinyl alcohol, 10% by weight, based on the solids content of the dispersion, of a melamine-formaldehyde-sodium sulfonate condensation product (Melament F20) having a molar ratio of the components of about 1:3:1, dissolved in water. The powder discharge was 85%.

(c) With an additional charge of 10% by weight of polyvinyl alcohol with a saponification value of 140 and a viscosity of 5 cp. (in a 4% solution at 20° C.) to the dispersion of (b), before the spray-drying, a separation of 98% resulted.

(d) To the resin dispersion, according to (a), 30% by weight of the melamine-formaldehyde-sodium sulfonate condensation product (Melament F20) were added, as under (b). The separation was 98.3%.

The particle size of the resin powder, according to (b) was, after redispersion in water, in a range of from 5 to $20\mu$. The particle size of the resin powder, according to (c) and (d) was, after redispersion in water, at a maximum of $5\mu$.

Concrete floorings from 25% by weight of portland cement and 75% by weight of sharp-edged sand, with a grain size from 0.2 to 7 mm., that contained 5% by weight, based on the cement, of resin powder (c) or (d), had an excellent adhesive strength on conventional foundations and were elastically deformable. With the addition of the powders of (b), 6% by weight had to be applied, in order to attain the same effect.

5 x 5 cm. floor tiles were laid on a concrete of the type 300 DIN 1045 with a floor tile adhesive containing 30% by weight of portland cement, 70% by weight of finely divided quartz and sand and 6% by weight, based on the cement of dispersion powder (2a) or (2c). After hardening under water for 28 days a tensile strength for (2a) of 4 kp./cm.², for (2c) of 8 kp./cm.² resulted.

To a mortar prepared according to DIN 1164, each time different resin powders in amounts of 10% by weight, based on the cement, were added (water/cement ratio 0.45). After 28 days of dry storage at 20° C. and a relative air humidity of 65% (normal climate), the following test data were determined on test pieces.

| Powder | None | (1a) | (1b) | (2c) |
|---|---|---|---|---|
| Degree of spreading in cm | 11.2 | 15.3 | 17.9 | 20 |
| Compression strength | 472 | 380 | 484 | 528 |
| Flexural tensile strength | 71 | 97 | 115 | 133 |

EXAMPLE (3a) A synthetic resin dispersion with a 50% by weight solid content of a vinyl acetate/vinyl laurate copolymer, containing 25% by weight of vinyl laurate, were spray-dried. The separation was about 50%. The powder had a strong tendency for agglomeration.

(b) To the aqueous synthetic resin dispersion under (3a) were added 75% by weight of a 20% melamine-formaldehyde-sodium sulfonate condensation product solution (Melament L300). The mixture was spray-dried and 94.5% of powder was discharged in the separation. The powder was free-flowing and well-dispersible with a maximum particle size of 10μ.

EXAMPLE (4a) A styrene/butadiene copolymer dispersion with a 45% by weight solid content, containing 60% by weight of styrene, was spray-dried. There resulted a separation of 60.4%. The powder could be redispersed and a particle size between 15μ and 22μ resulted.

(b) With an addition of 50% by weight of a 20% aqueous "Melment F10" solution to the dispersion under (4a) a powder discharge of 97.3% was attained. On redispersing this powder, the particle size was from 2 to 7μ.

The preceding specific embodiments are illustrative of the practice of the invention. It is to be understood however that other expedients, known to those skilled in the art or disclosed herein, may be employed without departing from the spirit of the invention or the scope of the appended claims.

We claim:

1. A process for the preparation of free-flowing, lump-free, water-redispersible synthetic resin powder which consists essentially in spray-drying an aqueous polymerizate dispersion of a water-insoluble synthetic resin having a softening point of between 0° C. and 40° C. and selected from the group consisting of polymers of acrylic acid esters, copolymers of styrene and acrylic or methacrylic acid esters, copolymers of styrene and butadiene, terpolymers of styrene, butadiene and acrylic acid esters, polymers of vinyl esters, copolymers of vinyl acetate and straight-chain vinyl esters, copolymers of vinyl acetate and branched vinyl esters, polymers of vinyl chloride, polymers of olefins, copolymers of vinyl chloride and olefins, copolymers of vinyl chloride acrylic acid esters and vinyl acetate, and copolymers of vinylidene chloride and acrylic acid esters, and having added thereto from 2% to 30% by weight, based on the solids content of said polymerizate dispersion, of a water-soluble condensation product of melamine and formaldehyde containing sulfonate groups in the molar ratio of melamine:formaldehyde:sulfonate groups of 0.5 to 2:2 to 4:0.5 to 2, under customary spray-drying conditions of exposure to warm gases at temperatures of from 30° C. to 50° C. and recovering said free-flowing, lump-free, water-redispersible synthetic resin powder.

2. The process of claim 1 wherein said water-soluble condensation product is added to said aqueous polymerizate dispersion in an amount of from 5% to 19% by weight, based on the solids content of said polymerizate dispersion.

3. The process of claim 1 wherein said sulfonate groups in said condensation product are alkali metal sulfonate groups.

4. The process of claim 1 wherein said molar ratio of melamine:formaldehyde:sulfonate groups is 1:3:1 and said sulfonate groups are alkali metal sulfonate groups.

5. The process of claim 1 wherein said water-soluble condensation product is the condensation product of one mol of melamine, three mols of formaldehyde and one mol of sodium bisulfite.

6. The product produced by the process of claim 1.

7. A process for improving hydraulic setting masses which consists in adding from 2% to 25% by weight, based on the hydraulic setting ingredients, of the product of claim 6 to a hydraulic setting mass.

References Cited

UNITED STATES PATENTS

| | | | |
|---|---|---|---|
| 3,340,237 | 9/1967 | Sellet | 260—29.4 UA |
| 3,409,578 | 11/1968 | Hwa | 260—29.6 TA |
| 3,435,009 | 3/1969 | Sellet | 260—29.4 UA |
| 3,661,829 | 5/1972 | Aignesberger | 260—29.4 R |

FOREIGN PATENTS

| | | | |
|---|---|---|---|
| 548,658 | 11/1957 | Canada | 260—29.4 R |

LORENZO B. HAYES, Primary Examiner

U.S. Cl. X.R.

106—90; 260—29.4 UA, 29.6 S, 851, 853, 855

UNITED STATES PATENT OFFICE
CERTIFICATE OF CORRECTION

Patent No. 3,784,648      Dated January 8, 1974

Inventor(s) Eduard Bergmeister, Paul-Gerhard Kirst and Heinz Winkler

It is certified that error appears in the above-identified patent and that said Letters Patent are hereby corrected as shown below:

Column 1, between lines 8 and 9 of Heading, the following should be inserted:

-- Claims priority, application Germany, October 6, 1970, P 20 49 114.9 --.

Signed and sealed this 13th day of May 1975.

(SEAL)
Attest:

RUTH C. MASON
Attesting Officer

C. MARSHALL DANN
Commissioner of Patents
and Trademarks